Aug. 3, 1965 O. H. BAUST 3,199,042

CONSTANT FALSE ALARM RATE VIDEO AMPLIFIER SYSTEM

Filed June 7, 1961 4 Sheets-Sheet 1

INVENTOR.
OLIVER H. BAUST

BY

Killman, Smith & Lamb
ATTORNEYS

CONSTANT FALSE ALARM RATE VIDEO AMPLIFIER SYSTEM

Filed June 7, 1961 4 Sheets-Sheet 2

INVENTOR.
OLIVER H. BAUST
BY
Killman, Smith & Lamb
ATTORNEYS

Aug. 3, 1965 O. H. BAUST 3,199,042

CONSTANT FALSE ALARM RATE VIDEO AMPLIFIER SYSTEM

Filed June 7, 1961 4 Sheets-Sheet 3

INVENTOR.
OLIVER H. BAUST
BY
Killman, Smith & Lamb
ATTORNEYS

Aug. 3, 1965 O. H. BAUST 3,199,042

CONSTANT FALSE ALARM RATE VIDEO AMPLIFIER SYSTEM

Filed June 7, 1961 4 Sheets-Sheet 4

*INVENTOR.*
OLIVER H. BAUST
*BY*
Killman, Smith & Lamb
ATTORNEY

United States Patent Office 3,199,042
Patented Aug. 3, 1965

3,199,042

CONSTANT FALSE ALARM RATE VIDEO AMPLIFIER SYSTEM

Oliver H. Baust, Baltimore, Md., assignor to The Bendix Corporation, Towson, Md., a corporation of Delaware Filed June 7, 1961, Ser. No. 115,531
9 Claims. (Cl. 330—124)

This invention relates generally to constant false alarm rate (CFAR) amplifiers and associated wide dynamic range detectors for the purpose of providing a wide dynamic range amplifier with improved performance where undesirable noise-like signals are present.

Wide dynamic range linear amplifiers have been provided in the past which employ successively saturating stages to achieve a linear logarithmic characteristic. These amplifiers suffer from the disadvantage that the sensitivity to small signals is reduced when large signals are present since the amplifier is then operating with its' most sensitive stages saturated corresponding to the relatively flat portion of the logarithmic characteristic. Another arrangement for providing an extremely wide linear range is disclosed and claimed in the co-pending application of Martin et al. for Linear Amplifier System, Serial No. 115,423, filed of even date herewith. While the linear amplifier described in this co-pending application provides improved performance in various applications it has not proved completely satisfactory in instances where a constant false alarm rate must be maintained in the presence of rapid fluctuations in the noise level.

It is accordingly the primary object of the present invention to provide an improved amplifier which has high sensitivity at all signal levels and yet is able to maintain a constant false alarm rate in the presence of rapid fluctuations in the noise level.

A further object of the invention is to provide a wide dynamic range detector for use in wide range amplifier systems.

Another object of the invention is to provide an improved amplifier system consisting of an IF amplifier, detector and video amplifier to obtain wide dynamic range at constant false alarm rate without loss of sensitivity to small signals.

Figure 1:
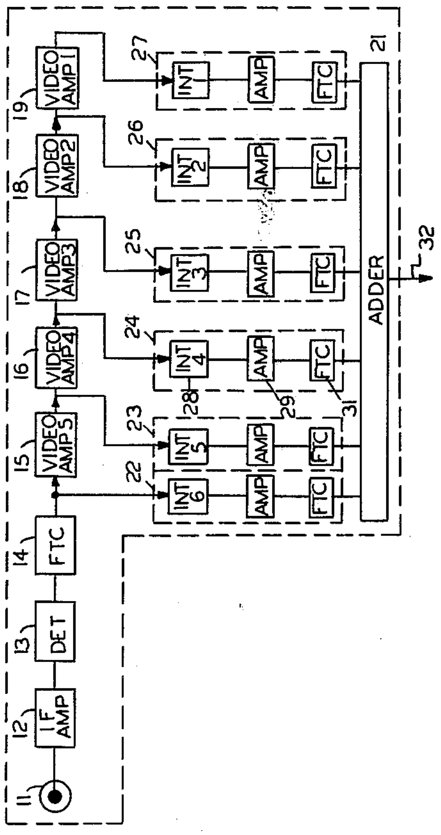
Figure 2:
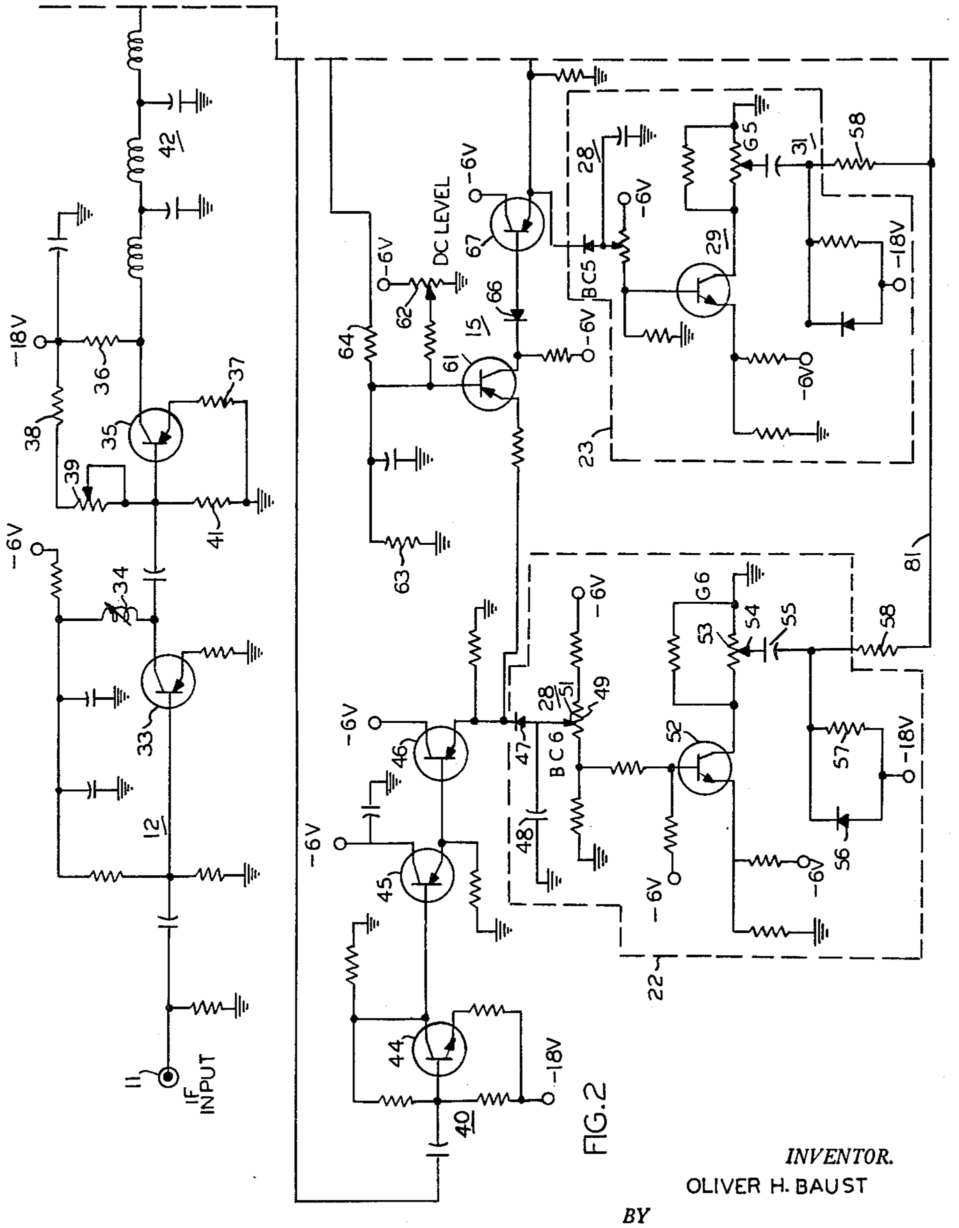
Figure 3:
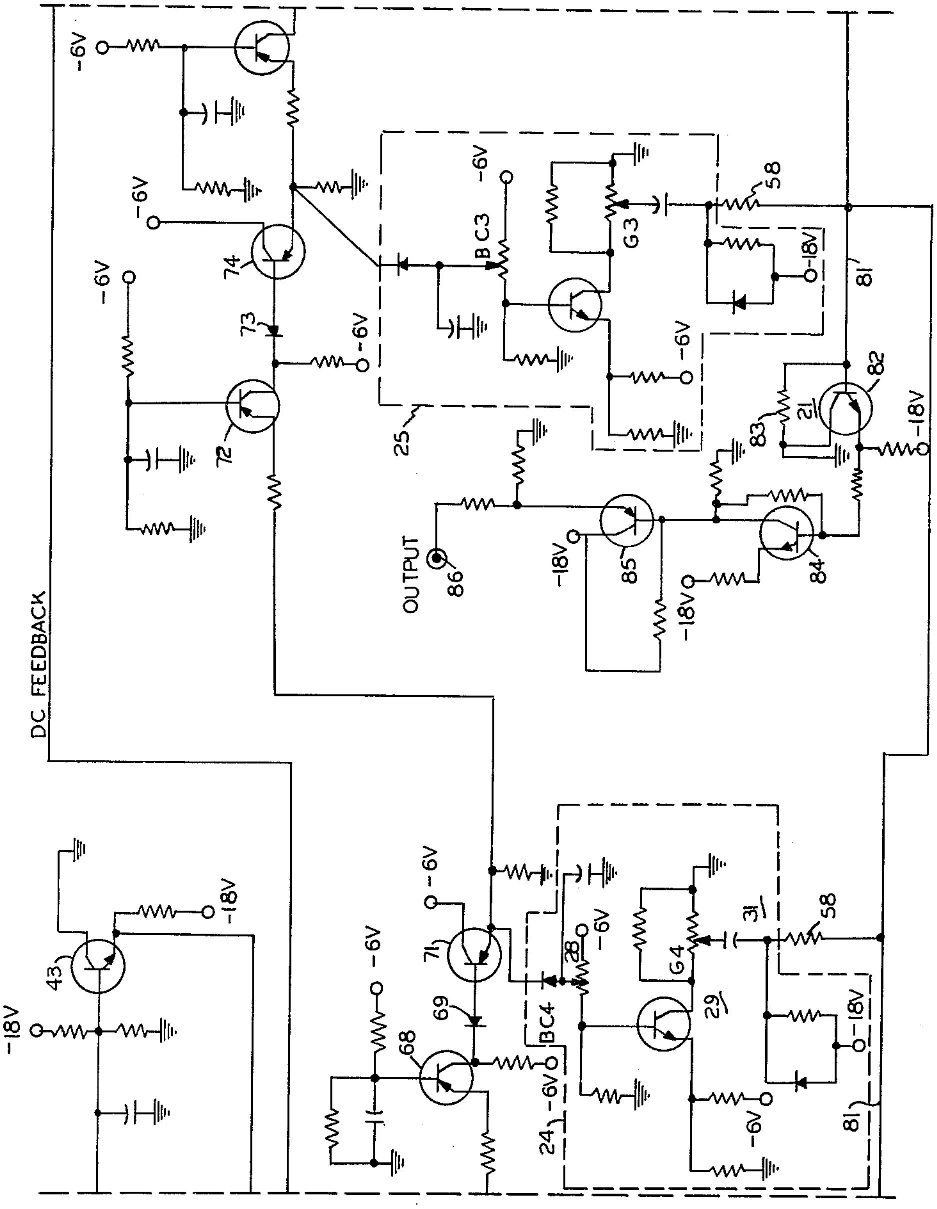
Figure 4:
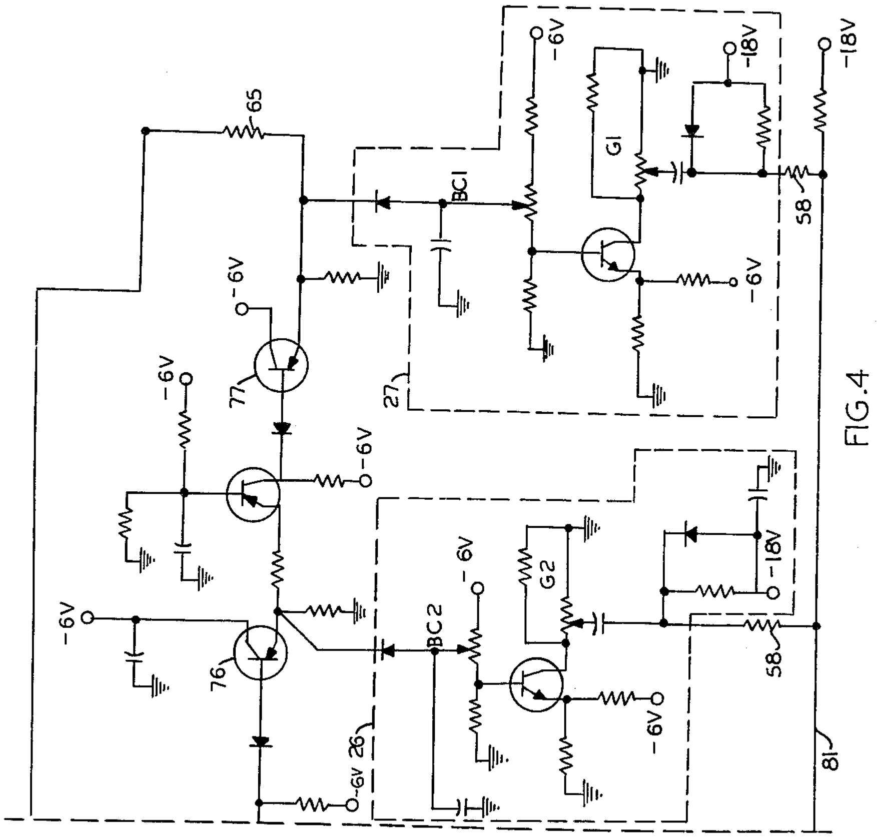

These and other objects of the invention will become apparent from the following detailed description taken in conjunction with the accompanying drawings wherein:

FIG. 1 is a block diagram of an improved amplifier system in accordance with the invention;

FIGS. 2, 3, and 4 when combined provide a complete schematic wiring diagram for the amplifier system of FIG. 1.

In accordance with the present invention a single IF amplifier stage drives a wide dynamic range detector, the non-saturating range of which is greater than 60 db. The output of the of the detector is differentiated and applied to a plurality of cascaded D.C. coupled video amplifiers. The inputs to each of the video amplifiers and the output of the final video amplifier stage are connected to pass through separate coupling circuits to an adder which combines the outputs from each of the tapped points on the video amplifier. The coupling circuits include a diode integrator circuit which produces a D.C. bias for controlling an amplifier in each coupling channel with the adjustments of the system being made so that the bias developed by the integrator cuts off the amplifier in its own channel at the same time that the respective video amplifier would begin to saturate. Thus weak signals are amplified in the entire video amplifier cascade while large signals saturate successive stages starting with the final stage until finally a signal 60 db above the minimum detectable signal will saturate all the stages. The gain at the various stages is adjusted so that the noise amplitude at the input to the adder is the same irrespective of which channel is supplying the input which is instantaneously effective to the adder.

Referring to FIG. 1 now, the amplifier system for the amplification of amplitude modulated IF signals provides an input terminal 11 which couples IF signals to an IF amplifier stage 12. The output of the IF amplifier 12 is detected in a wide dynamic range detector 13 which will be described in detail hereinafter. Detected signals which may be of a pulse character are differentiated in a fast time constant circuit 14 from which they pass to an input video amplifier stage 15. The video signals are amplified in successive video stages 16, 17, 18 and 19. The input signal to each of the video stages 15–19 and the output signal from video amplifier 19 are connected respectively through coupling circuits 22–27 to an adder 21 which has the characteristic of producing an output signal corresponding to the sum of the input signals thereto. Each of the coupling circuits 22–27 includes a diode integrator circuit 28 which produces a D.C. level corresponding to the noise input thereto which is applied as bias to an amplifier 29. This bias has sufficient magnitude to bias amplifier 29 to cut-off when the video amplifier stage which drives the coupling circuit begins to saturate. For example the level at which the amplifier 29 in coupling circuit 24 is cut-off is determined by the point at which video amplifier 16 begins to saturate. The output of each of the amplifiers 29 is differentiated in a fast time constant circuit 31 before being applied as one of the inputs to the adder 21. The output of the adder circuit 21 appears at lead 32 and when the system is properly adjusted provides a constant false alarm rate operation and substantially constant sensitivity over a wide dynamic range.

Referring now to FIGS. 2, 3 and 4 assembled to form a complete schematic diagram of the system of FIG. 1 a detailed description thereof will be given. Input terminal 11 is supplied with amplitude modulated IF signals from a non-saturating source over the range of operation desired. The signals into terminal 11 are coupled to the base of an IF amplifier transistor 33 which has a tuned collector load 34 operating at the intermediate frequency of the system. The IF signal from the collector of the transistor 33 is A.C. coupled to the base of a detector transistor 35 which is biased for approximately class B operation. For this purpose the transistor may be a type 2N502 operated with circuit parameters as follows. A collector load resistor 36 has a value of 2200 ohms and an emitter resistor 37 has a value of 220 ohms. A bias supply voltage divider from the 18 volt supply is provided by a 120,000 ohm resistor 38, a variable 100,000 ohm resistor 39, and a fixed resistor 41 between base and ground of 2200 ohms. With these values the resistor 39 can be adjusted to make the base voltage of the transistor 35 the required value for class B operation and the transistor 35 then operates as a detector over a very wide dynamic range of approximately 60 db.

The output of the detector 35 passes through a filter circuit 42 comprising several lowpass L-filter networks. The video signal containing the recovered modulation is passed through an emitter follower transistor 43 and coupled through a fast time constant (2 microseconds) circuit 40 to a stabilized transistor amplifier 44. The transistor 44 collector is direct coupled through two emitter followers 45 and 46 which drive the first video amplifier 15 and the first integrator circuit 28 in coupling circuit 22. The integrator circuit 28 consists of a diode 47 and an integrating capacitor 48. The diode 47 is back biassed from a negative 6 volt supply through a voltage divider which includes potentiometer 49 having an adjustable tap 51 to which the diode 47 and capacitor 48 are connected. The integrated signals from integrator 28 are applied to the base of an amplifier transistor 52 which has a collector plate load including a potentiometer 53. Signals at a selected level are obtained via tap 54 and applied to a fast time constant differentiating circuit comprising capacitor 55 and diode 56 in parallel with resistor 57. The differentiated signals are applied through an input resistor 58 to the adder circuit 21, the resistor 58 being equal in value to the corresponding resistor in the other inputs to the adder 21 for the remaining video stages.

The signals from the emitter of transistor 46 are also applied to the next video stage through a transistor 61. The base of transistor 61 operates with respect to a selectable negative D.C. potential obtained from the tap of a potentiometer 62. This same base electrode is also connected to a heavily bypassed D.C. feedback loop which includes resistors 63, 64 and 65, the latter resistor being shown connected to the emitter of transistor 77 in FIG. 4.

Signals from the collector of transistor 61 are coupled through a diode 66 to the base of an emitter follower transistor 67 which supplies the coupling circuit 23 having corresponding components to those described in detail for coupling circuit 22. The diode 66 provides both A.C. and D.C. coupling while producing approximately one-half volt D.C. translation between the stages 61 and 67.

The output of transistor 67 taken from its emitter electrode is applied through a D.C. coupling circuit to the emitter of a transistor 68 which operates with a fixed base bias and supplies output signals at its collector to a coupling diode 69 similar to diode 66. Signals coupled by the diode 69 drive the base of a transistor 71 connected as an emitter follower to drive the coupling circuit 24 and the subsequent transistor 72. The transistor 72 supplies signals through coupling diode 73 which is connected to drive the next emitter follower 74. The transistor 74 drives coupling circuit 25 and this circuit arrangement is repeated as shown with transistor 76 driving coupling circuit 26 and transistor 77 driving coupling circuit 27.

The output of each of the coupling circuits 22–27 is applied through respective equal valued resistors 58 to a common line 81 which drives the base of a transistor 82 connected as an emitter follower. The base of the transistor 82 has a relatively large value resistor 83 connected to ground to operate with the resistors 58 as the adding circuit 21 the added signals being applied through transistors 84 and 85 to an output terminal 86. The signal at the output terminal 86 is thus the sum of the signals at the inputs derived through the resistors 58 from each of the coupling circuits 22–27 inclusive.

To obtain the desired constant false alarm rate operation the amplifier system of the present invention is adjusted as follows. The diode detector 35 is biased for class B operation at the potentiometer 39 and begins detection of IF signals at approximately the 500 micro-volt level. Detection then occurs for larger valued input signals over a range of approximately 60 db and since detection over this wide range is not completely linear the amplifier coupling circuits 22–27 are adjusted to compensat for this nonlinearity as well as to maintain the constant false alarm rate characteristic. The adjustment procedure is as follows where the potentiometers 53 in each of the coupling circuits 22–27 have been designated G1–G6 and the potentiometers 49 have been designated BC1–BC6:

(1) Adjust power supply voltages to −18 and −6 volts.

(2) Provide a non-saturating 30 mc. source with 60 db range to terminal 11.

(3) Apply a 30 mc. pulse to the input. With scope probe on emitter of transistor 43 adjust inductor 34 for maximum signal.

(4) Adjust resistor 39 (Det. Bias) for best detection of small signals.

(5) Set potentiometers G1–G6 inclusive for minimum gain (i.e. movable contact 54 at ground potential).

(6) Set potentiometers BC1–BC6 inclusive to make tap 51 most negative (i.e. at −6 v. end of potentiometer).

(7) Remove input signal and set D.C. level potentiometer 62 to provide approximately half of the supply voltage at the emitter of transistor 77, for proper operation of the feedback loop.

(8) Connect the scope to output terminal 86.

(9) Adjust potentiometer BC1 so that the noise character is most homogeneous. (If the potentiometer is too far in either direction the noise will appear sparse and coarse.)

(10) Adjust potentiometer G1 for approximately 0.5 volt of noise on scope.

(11) Connect a 30-mc. noise source to the input terminal 11 and increase noise until a slight change in noise output is noticed.

(12) Increase noise input by 15 db and set potentiometer G2 for maximum gain.

(13) Adjust potentiometer BC2 for best noise character as in step 9.

(14) Readjust G2 for 0.5 volt of noise as in step 10.

(15) Increase noise input by 10 db and adjust potentiometers G3 and BC3 as in steps 12 and 13.

(16) Increase noise another 10 db for each stage and adjust BC and G potentiometers in each channel as indicated in above steps.

(17) Recheck steps 8 through 16 readjusting potentiometers to smooth out variations in noise level, and disconnect noise source from preamplifier.

The amplifier of the present invention constructed and adjusted in accordance with the present teaching provides a wide dynamic range of the order of 60 db with substantially constant sensitivity for small signals even in the presence of large signals. At the same time the amplifier provides a constant false alarm rate by maintaining the noise level constant irrespective of the channel which is in operation to amplify the noise signal to the output through the adder circuit. This amplifier characteristic is highly useful in many applications wherever a wide dynamic range is required in the presence of noise which tends to obliterate small signals or produce undesirable false alarm rate fluctuations in conventional circuits.

Many modifications may be made in the details of the present system without departing from the teachings of the present invention and accordingly the invention is to be limited only by the scope of the appended claims.

I claim:

1. An amplifier system comprising a low level intermediate frequency amplifier, a wide dynamic range detector coupled to said amplifier, a plurality of cascaded video stages having the input to the first stage thereof fed from said detector, an adder circuit, and a plurality of signal coupling means for coupling the signal at the input of each of said video stages and the output of the final video stage to said adder circuit, each of said signal coupling means having a diode integrator to which signal is applied, a bias controlled amplifier and a fast time constant circuit in cascade, each of said integrators developing a D.C. bias proportioned to the level of the input thereto for controlling said cascaded amplifier, said bias being adjusted for each coupling means to cut off said cascaded amplifier therein at the commencement of saturation of the video stage driving that coupling means.

2. Apparatus according to claim 1 in which said wide dynamic range detector comprises a grounded emitter transistor having an adjustable base voltage for establishing substantially class B operation.

3. A constant false alarm rate video amplifier comprising a plurality of cascaded video stages having the input to the first stage thereof fed from a source of video signals, an adder circuit, and a plurality of signal coupling means for coupling the signal at the input of each of said video stages and the output of the final video stage to said adder circuit, each of said signal coupling means having a diode integrator to which signal is applied, a bias controlled amplifier and a fast time constant circuit in cascade, each of said integrators developing a D.C. bias proportioned to the level of the input thereto, said bias being adjusted for each coupling means to cut off said cascaded amplifier when the video stage driving coupling means begins to saturate.

4. An amplifier system comprising a low level intermediate frequency amplifier, a wide dynamic range detector fed by said amplifier, a plurality of cascaded video stages with the first stage thereof fed from said detector, a combining circuit for combining a plurality of input signals to produce a composite output signal, and a plurality of signal coupling means for coupling to said combining circuit the signal at the input of each of said video stages and the output of the final video stage, each of said signal coupling means having a diode integrator to which signal to be conducted by said coupling means is applied, said integrator developing a D.C. bias in accordance with the level of the applied signal, an adjustable voltage source connected to back bias said diode, an amplifier providing gain varying in accordance with bias developed by said integrator for amplifying signals from said diode integrator, said back-bias being adjusted to develop said D.C. bias sufficient to cut off said variable gain amplifier when the video stage driving said integrator begins to saturate, and means for coupling output signals from said variable gain amplifier as said input signals to said combining circuit.

5. A constant false alarm rate video amplifier comprising a plurality of cascaded video stages, a combining circuit for combining a plurality of input signals to produce a composite output signal, and a plurality of signal coupling means for coupling the signal at the input of each of said video stages and the output of the final video stage as said input signals to said combining circuit, each of said signal coupling means having a diode integrator to which signal to be coupled is applied for developing a D.C. level in accordance with the signal level into said integrator, an adjustable voltage source connected to back bias said diode, a bias controlled amplifier connected to amplify signals from said diode integrator and to be biased by said D.C. level, said back-bias being adjusted to develop said D.C. level sufficient to cut off said bias controlled amplifier at the commencement of saturation of the video stage driving said coupling means, and means for coupling output signals from said bias controlled amplifier as said input signals to said combining circuit.

6. A constant false alarm rate video amplifier comprising a plurality of cascaded successively saturating video stages, an adding circuit having an input from each of said successive video stages, a signal level detector for each of said video stages, and means responsive to the signal level detected at each stage for successively disabling the input to said adding circuit from each stage upon saturation of the video stage supplying said input.

7. An amplifier system comprising a low level intermediate frequency amplifier, a wide dynamic range detector coupled to said amplifier, a plurality of cascaded successively saturating video stages for amplifying the video output of said detector, an adding circuit having an input from each of said video stages, a signal level detector for each of said video stages, and means responsive to each detected level for disabling each successive input to said adding circuit when the video stage supplying said input reaches saturation.

8. Apparatus according to claim 7 and including a differentiating circuit connected between said detector and the input of said cascaded video stages.

9. An amplifier system comprising a low level intermediate frequency amplifier, a grounded emitter transistor having an adjustable base voltage for establishing substantially class B operation, means for coupling intermediate frequency signals from said amplifier to the base-emitter circuit of said transistor, a plurality of cascaded successively saturating video stages having the input to the first stage thereof coupled to the emitter collector circuit of said transistor, an adding circuit having an input from each of said video stages, a signal level detector for each of said video stages, and means responsive to the respective detected levels for disabling each successive input to said adding circuit when each successive video stage supplying said input reaches saturation.

References Cited by the Examiner

UNITED STATES PATENTS

| | | | |
|---|---|---|---|
| 2,301,648 | 11/42 | Thompson | 325—480 |
| 2,790,854 | 4/57 | Ward | 330—124 |
| 2,858,987 | 10/58 | Stern | 329—101 X |
| 2,864,002 | 12/58 | Straube | 329—101 |
| 2,921,196 | 1/60 | Chow | 329—101 |
| 2,930,987 | 3/60 | Groce et al. | 330—136 |
| 2,968,768 | 1/61 | Volkers | 330—124 |

ROY LAKE, *Primary Examiner.*

JOHN KOMINSKI, *Examiner.*